United States Patent [19]
Beck

[11] 4,134,426
[45] Jan. 16, 1979

[54] SEAWATER HYDRAULIC MOTOR DISTRIBUTING VALVE BASED ON A HYDROSPHERE BEARING

[75] Inventor: Earl J. Beck, Ventura, Calif.

[73] Assignee: The United States of America as represented by the Secretary of the Navy, Washington, D.C.

[21] Appl. No.: 875,825

[22] Filed: Feb. 7, 1978

Related U.S. Application Data

[63] Continuation of Ser. No. 733,586, Oct. 18, 1976, abandoned.

[51] Int. Cl.² .............................................. F16K 25/02
[52] U.S. Cl. .................................. 137/625.23; 251/315
[58] Field of Search ..................... 137/625.23, 625.22, 137/246.12; 251/368, 333, 315

[56] References Cited

U.S. PATENT DOCUMENTS

| | | | |
|---|---|---|---|
| 2,749,941 | 6/1956 | Gardner | 137/625.23 |
| 3,059,667 | 10/1962 | Coceano | 251/368 X |
| 3,129,644 | 4/1964 | Anderson | 137/625.23 X |
| 3,592,440 | 7/1971 | McFarland | 251/368 |
| 3,757,819 | 9/1973 | Andis | 137/625.23 |
| 3,767,164 | 10/1973 | Robinson | 251/368 X |

Primary Examiner—Alan Cohan
Attorney, Agent, or Firm—Richard S. Sciascia; Joseph M. St.Amand; Andrew S. Viger

[57] ABSTRACT

A commutating or distributing valve for timing and distributing high pressure seawater to a number of individual pistons in a multi-piston hydraulic motor using seawater under pressure as a motivating fluid.

10 Claims, 4 Drawing Figures

SEAWATER HYDRAULIC MOTOR DISTRIBUTING VALVE BASED ON A HYDROSPHERE BEARING

This is a continuation, of application Ser. No. 733,586 filed Oct. 18, 1976, now abandoned.

BACKGROUND OF THE INVENTION

The present invention pertains generally to hydraulic tools and more particularly to a distributing valve which is capable of using seawater as a hydraulic fluid. In general, there are a limited number of motors which can be used for powering portable tools and other submersible equipment in the ocean, each of which has its various advantages and disadvantages. Electric motors, while feasible in principle, have not proved reliable, especially since numerous controls with high sensitivity are necessary to prevent electric shock which necessarily increases the complexity of the device and its overall cost. The inherent danger of such electrical motors due to the electric shock hazard has, in this manner, limited their use in a salt water environment.

Although air tools have been found to be useful and safe in a seawater environment, they also present several disadvantages and limitations. Although only a single connection is required to the water's surface, thereby providing good maneuverability, air tools introduce an excessive amount of bubbles at the point of operation which restricts vision and, in general, interferes with underwater work. In addition, air operated tools are basically inefficient especially at deeper water levels where the air must be compressed to the local pressure. Additionally, air is almost totally lacking in lubricating qualities which is quite important in preventing excessive wear.

Since the ocean itself is a hydraulic environment, it is logical to consider the use of hydraulic tools for underwater use. In a closed hydraulic system utilizing suitable hydraulic fluid, very high pressure outputs can safely be obtained with remarkably small motors. These motors are also capable of being quite efficient. With a petroleum-based hydraulic fluid of suitable viscosity, pressure losses are moderate with short lines, lubrication is excellent within the system, and the torque speed characteristics are almost constant over a wide range of operating characteristics.

While safe, practical and efficient, oil-filled closed hydraulic systems also have various limitations and disadvantages. Since conventional hydraulic fluids are normally lighter than water, hydraulic pressure drops below local ambient sea pressure prevent operation of the hydraulic tools without the application of greater pressures on the hydraulic fluid. The high pressure hydraulic hoses required to provide the extremely high hydraulic pressures needed at lower depths tend to be stiff and, in general, very hard to handle by a diver. The requirement of a second return hose imposes increased handling forces on a diver which, in many cases, render the hydraulic system unmanageable.

An open system using seawater as the hydraulic medium, on the other hand, eliminates many of these problems encountered with the hydraulic oil type system. In such an open system using seawater, only a single hose is required between the powered equipment and the tools, thereby immediately eliminating half of the handling forces imposed by the stiff hydraulic hoses. In addition, a seawater system has an obvious advantage in that leakage in either direction, i.e., either from or into the system, does not cause contamination. Furthermore, because seawater has a lower viscosity, lines carrying water can be considerably smaller to achieve a given pressure than the lines required in an oil-filled closed system.

The very properties of water which make it ideal as a hydraulic fluid in a seawater environment, however, have introduced various other problems related to efficiency, friction and wear. Specifically, the relatively high viscosity, good lubricating and essentially non-corroding properties of hydraulic oil in conventional multi-piston hydraulic motors allows for the use of low tolerances and dissimilar metals between mating parts. However, use of an electrolyte such as seawater as the hydraulic fluid medium prevents the use of mating parts which form galvanic pairs due to possible corrosion. Additionally, clearances between mating parts must be greatly reduced due to the low viscosity of water as the hydraulic medium. Otherwise, excessive leakage produces a very inefficient system. These problems have been successfully overcome in a device for converting high pressure water into mechanical force. However, the problems of excessively close tolerances, non-corroding pairs of metals, and low viscosity hydraulic fluid have prevented the successful development of a commutating or distributing valve which is a necessary component in any multi-piston hydraulic motor.

SUMMARY OF THE INVENTION

The present invention overcomes these disadvantages and limitations of the prior art by providing a seawater hydraulic motor distributing valve based on a hydrosphere bearing. The invention comprises a hydrosphere bearing which is rotated in a manner to distribute high pressure hydraulic fluid to a plurality of outlet ports in a sequential manner. The bearing also provides low pressure exhaust ports for exhausting the hydraulic fluid subsequent to providing motive force.

It is therefore an object of the present invention to provide a seawater hydraulic motor distributing valve based on a hydrosphere bearing.

It is also an object of the present invention to provide a seawater hydraulic motor distributing valve based on a hydrosphere bearing which has nearly zero clearance.

Another object of the present invention is to provide a seawater hydraulic motor distributing valve based on a hydrosphere bearing which is highly efficient.

Another object of the present invention is to provide a seawater hydraulic motor distributing valve based on a hydrosphere bearing which is not subject to corrosion or excessive wear.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description. The foregoing abstract of the disclosure is for the purpose of providing a non-legal brief statement to serve as a searching and scanning tool for scientists, engineers and researchers, and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT

Figure 1:
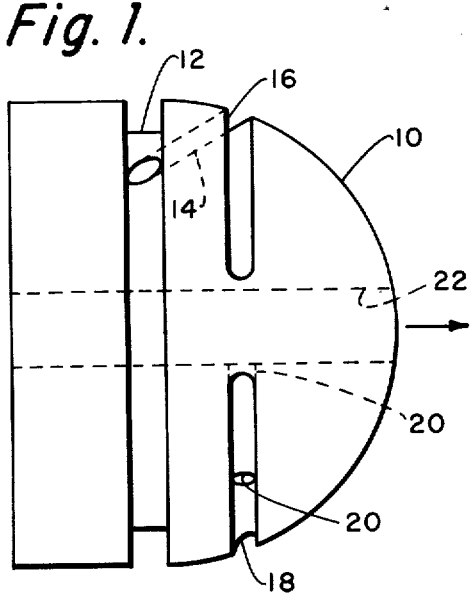
FIG. 1 is a side view of the ball portion of the seawater hydraulic motor distributing valve of the preferred embodiment of the invention.
Figure 2:
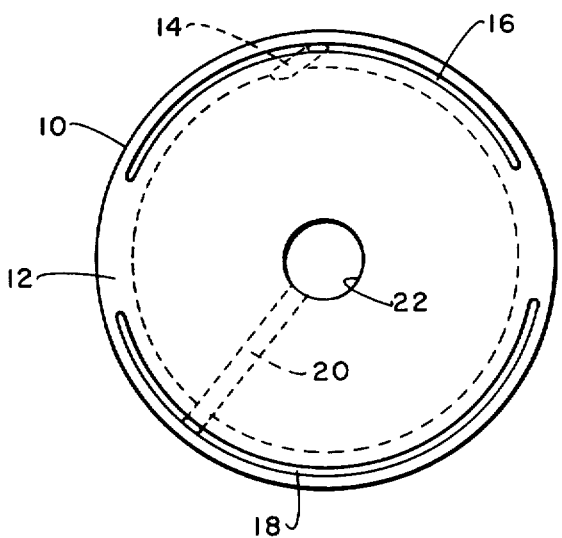
FIG. 2 is an end view of the ball portion of the preferred embodiment of the invention.
Figure 3:
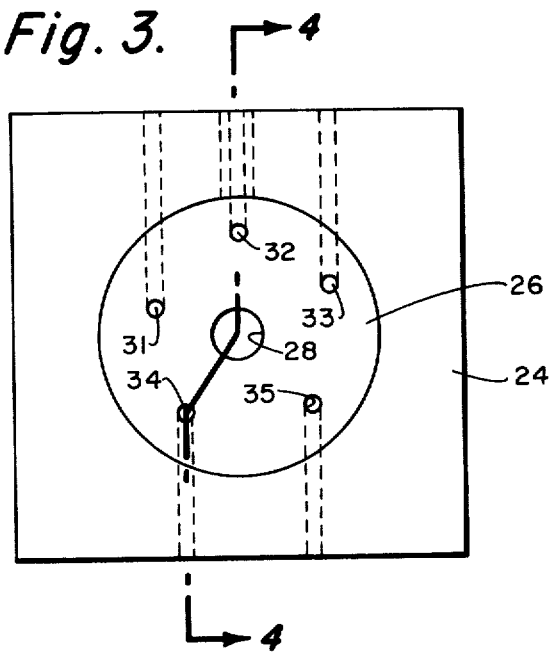
FIG. 3 is a top view of the socket portion of the preferred embodiment of the invention.

In multiple piston hydraulic motors, it is necessary to time the emission and rejection of working fluid to create motive power. In pumps and compressors, the pressure pulses generated by pistons are isolated by the use of spring-loaded check valves. This is not the case in hydraulic motors where high pressure fluid must be supplied to the motor to change the potential or pressure energy into mechanical power. The "timing" of high pressure pulses of fluid required by hydraulic motors must necessarily be controlled from outside the piston system to ensure force on the piston only during the part of the stroke when power can be successfully transmitted to a shaft through connecting rods, swash plate cams, or other means for converting energy. FIGS. 1 through 3 illustrate a seawater hydraulic motor distributing valve based on a hydrosphere bearing for distributing high pressure pulses of seawater at the proper time to a hydraulic motor.

FIG. 1 is a side view of the ball portion 10 of the distributing valve. As shown, the ball portion has a groove 12 formed therein which accepts high pressure fluid from an outside source. An interior channel 14 connects the high pressure groove 12 to the high pressure distributing groove 16. As shown in FIG. 2, the high pressure distributing groove 16 is formed in the ball portion 10 symmetrically about the center axis in an arc of approximately 140° around the circumference of the ball. Groove 16 functions to distribute the high pressure fluid in a circular manner around the surface of the ball as it is rotated on its axis. In a similar manner, a low pressure distributing groove 18 is formed around the circumference of the ball 10 and functions to accept low presure hydraulic fluid from a multi-piston hydraulic motor. Interior channel 20 functions to exhaust this low pressure fluid from the low pressure distributing groove 18 to the centrally located exhaust port 22.

Figure 4:
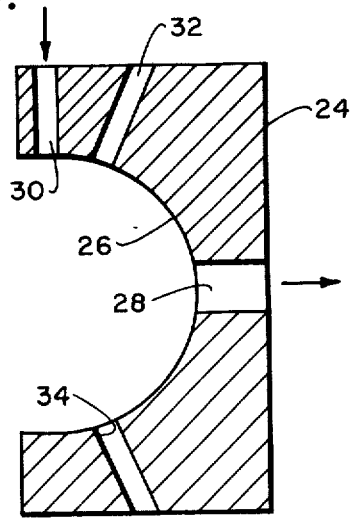
FIG. 4 is a cut away view of the socket portion along section 4—4.

FIGS. 3 and 4 illustrate the socket portion 24 of the seawater hydraulic motor distributing valve of the preferred embodiment. FIG. 3 is a top view of the socket portion illustrating the concave socket 26 in which the ball 10 is fit with zero clearance. The socket 24 is formed with an exhaust port 28 for removal of exhausted hydraulic fluid received from exhaust port 22 of the ball portion 10. A high pressure inlet channel 30 is also formed in the socket portion 24 for applying high pressure fluid from an outside source to the distributing valve.

As shown in FIG. 4, the high pressure inlet channel 30 is aligned with the high pressure groove 12 in ball 10 such that high pressure fluid is constantly supplied to interior channel 14 and distributing groove 16 for any angular displacement of the ball within the socket portion 26.

As shown in FIGS. 3 and 4, a series of distributing channels 31 through 35 are formed within the socket 24 and are equally distributed around its circumference. As shown in FIG. 4, these distributing channels are vertically aligned with the high pressure distributing groove 16 and low pressure distributing groove 18 when the ball portion 10 is fitted within the socket 24. Each of the distributing channels 31 through 35 function both as a pressure port and an exhaust port. The high pressure distributing groove 16 sequentially applies high pressure fluid to each of the distributing channels as the ball is rotated. In a similar manner, the low pressure exhausting groove 18 sequentially exhausts fluid from the distributing channels. The distributing valve, as shown, is therefore designed to operate with a five cylinder hydraulic motor applying high pressure pulses and exhausting expended fluid at the proper times to create motive power.

Use of the hydrosphere bearing concept as a distributing valve provides several advantages. Since the bearing can be formed with zero clearance, there is effectively zero leakage in the distributing valve when it is not rotating. When rotating, these close tolerances provide very stiff bearing action with small axial displacement and very high efficiency.

The hydrosphere bearing arrangement also allows for use of non-corroding mating materials such as steel for the ball portion 10 and a very stiff plastic for the socket portion 24. The plastic socket portion, of course, can be formed with a structural material which will prevent its deflection under pressure so that the system will retain its small clearances and thereby its efficiency. This is very much unlike a sleeve-type distributing valve in which tolerances have been hard to maintain with plastic materials due to the expansion forces on the plastic rather than the compression forces which are created within the hydrosphere bearing. If formed of plastic, the socket portion can be manufactured by casting or grinding (lapping) to the male part to provide initial zero clearance. In this manner, no manufacturing process to ensure the necessity of small clearances is required since the bearing creates its own small clearances by very small axial displacement during operation. Necessary porting and grooving can be accomplished after the mating pair are fitted for zero clearance.

The male portion can be formed of any stiffened, non-corroding metal such as stainless steel, titanium, etc.

Another advantage of the use of the hydrosphere bearing arrangement as a distributing valve is its ability to use very non-viscous liquids such as water as a fully developed hydrodynamic film. The resulting viscous friction is low and the clearance is small to provide a bearing which is very stiff in the axial direction and highly efficient in operation.

Obviously many modifications and variations of the present invention are possible in light of the above teachings. For instance, the desired locations of the high pressure distributing groove 16 and the low pressure exhausting groove 18 can be varied to improve efficiency. Similarly, the length of these grooves can be varied to provide the optimum efficiency for any number of hydraulic cylinders in a multi-piston hydraulic motor. It is therefore to be understood that within the scope of the appended claims the invention may be practiced otherwise than as specifically described.

What is claimed is:

1. A seawater hydraulic motor distributing valve comprising:
   a. a housing having a portion defining a hemispherically shaped socket;
   b. a spherically shaped ball disposed within said shemispherically shaped socket; said ball being constrained to rotate within said socket about a central axis;
   c. said ball having a high pressure groove formed therein around its circumference connected by a first interior channel to a high pressure distributing groove, said ball also having a low pressure exhausting groove aligned with said high pressure distributing groove connected to a first exhaust port by a second interior channel; and
   d. said socket having a high pressure inlet channel aligned with said high pressure groove, a second exhaust port aligned with said first exhaust port, and a series of distributing channels having ports in said socket which are equally distributed around said socket and aligned with said high pressure distributing groove and said low pressure exhausting groove;
   e. said ball and said socket forming a stiff-action hydrosphere bearing which is capable of continuous, dyanmic operation with a low viscosity working fluid such as water with a minimum of leakage.

2. The valve of claim 1 wherein said ball is formed from stainless steel.

3. The valve of claim 1 wherein said ball is formed from titanium.

4. The valve of claim 1 wherein said socket is formed from plastic coated steel.

5. The valve of claim 1 wherein said socket is formed from Teflon coated steel.

6. The valve of claim 4 wherein said ball is formed from stainless steel.

7. The valve of claim 5 wherein said ball is formed from stainless steel.

8. The valve of claim 4 wherein said ball is formed from titanium.

9. The valve of claim 5 wherein said ball is formed from titanium.

10. A seawater hydraulic motor distributing valve comprising:
    a. a housing having a portion defining a hemispherically shaped socket;
    b. a spherically shaped ball disposed within said hemispherically shaped socket, said ball being mated to said socket such that under static conditions there is zero clearance between said ball and said socket; said ball being constrained to rotate within said socket about a central axis;
    c. said ball having a high pressure groove formed therein around its circumference connected by a first interior channel to a high pressure distributing groove, said ball also having a low pressure distributing groove connected to a first exhaust port by a second interior channel; and
    d. said socket having a high pressure inlet channel aligned with said high pressure groove, a second exhaust port aligned with said first exhaust port, and a series of distributing channels having ports in said socket which are equally distributed around said socket and aligned with said high pressure distributing groove and said low pressure exhuasting groove;
    e. said ball and said socket forming a stiff-action hydrosphere bearing which is capable of continuous, dynamic operation with a low viscosity working fluid such as water with a minimum of leakage.

* * * * *